(12) United States Patent
Choi et al.

(10) Patent No.: US 10,474,787 B2
(45) Date of Patent: Nov. 12, 2019

(54) METHOD FOR DESIGNING CENTRIFUGAL PUMP AND MIXED FLOW PUMP HAVING SPECIFIC SPEED OF 150-1200

(71) Applicant: Korea Institute of Industrial Technology, Chungcheongnam-do (KR)

(72) Inventors: Young Seok Choi, Gyeonggi-do (KR); Kyoung Yong Lee, Chungcheongnam-do (KR); Sung Kim, Chungcheongnam-do (KR)

(73) Assignee: Korea Institute of Industrial Technology, Chungcheongnam-Do (KR)

( * ) Notice: Subject to any disclaimer, the term of this patent is extended or adjusted under 35 U.S.C. 154(b) by 302 days.

(21) Appl. No.: 15/106,672

(22) PCT Filed: Dec. 16, 2014

(86) PCT No.: PCT/KR2014/012391
§ 371 (c)(1),
(2) Date: Jun. 20, 2016

(87) PCT Pub. No.: WO2015/093816
PCT Pub. Date: Jun. 25, 2015

(65) Prior Publication Data
US 2016/0342730 A1      Nov. 24, 2016

(30) Foreign Application Priority Data

Dec. 20, 2013  (KR) .................. 10-2013-0160493

(51) Int. Cl.
*F04D 1/12*       (2006.01)
*G06F 17/50*      (2006.01)
*G06F 17/11*      (2006.01)

(52) U.S. Cl.
CPC .......... *G06F 17/5086* (2013.01); *G06F 17/11* (2013.01); *G06F 17/5009* (2013.01)

(58) Field of Classification Search
CPC ... G06F 17/5086; G06F 17/11; G06F 17/5009
See application file for complete search history.

(56) References Cited

U.S. PATENT DOCUMENTS 6,062,819 A * 5/2000 Zangeneh ........... F04D 29/2205
                                                      415/181
7,021,890 B2 * 4/2006 Ishigaki .................. F04D 1/025
                                                      415/72

FOREIGN PATENT DOCUMENTS

JP    2003106298 A    4/2003
KR    20010018936 A   3/2001
(Continued)

OTHER PUBLICATIONS

KR 2010-0021308—Translation (Year: 2010).*
(Continued)

*Primary Examiner* — Brian W Wathen
*Assistant Examiner* — Abdou K Seye
(74) *Attorney, Agent, or Firm* — Levenfeld Pearlstein, LLC

(57) ABSTRACT

A method for designing a centrifugal pump and a mixed flow pump having a specific speed of 150-1200 comprises a design specification determination step for a turbo pump including an impeller, a specific speed determination step for the impeller, a design variable determination step for the impeller, and a three dimensional shape deriving step for the impeller. According to the present invention, the three dimensional shape of the impeller can be simply designed by converting the design variables related to the specific speed into a function and by putting optimized design variables into a database.

7 Claims, 16 Drawing Sheets

(56) References Cited

FOREIGN PATENT DOCUMENTS

| KR | 100739083 B1 | | 7/2007 |
|---|---|---|---|
| KR | 20100021308 A | * | 2/2010 |
| KR | 20100021308 A | | 2/2010 |

OTHER PUBLICATIONS

Choi, Young Seok et al., Design Optimization of Mixed-flow Pump Impellers and Diffusers, Thesis, Dec. 2008, pp. 57-62, Korean Society for Fluid Machinery, South Korea.

Kim, Sung et al., Blade Shape Design of Mixed-flow Pump Impellers and Diffusers in a Fixed Meridional Geometry, Thesis, Jun. 2009, pp. 1203-1208, The Society of Air-Conditioning and Refrigerating Engineer of Korea, South Korea.

* cited by examiner

CENTRIFUGAL        MIXED FLOW

<CONVERSION OF DESIGN VARIABLE INTO FUNCTION>

<3D SHAPE OF IMPELLER>

<BUILDING OF GUI ENVIRONMENT>

<MERIDIONAL PLANE D/B>

<OPTIMIZATION OF DESIGN VARIABLE>

<DESIGN OF MERIDIONAL PLANE OF IMPELLER>

# METHOD FOR DESIGNING CENTRIFUGAL PUMP AND MIXED FLOW PUMP HAVING SPECIFIC SPEED OF 150-1200

CROSS-REFERENCE TO RELATED APPLICATIONS

This is a National Stage Application of International Patent Application No. PCT/KR2014/012391, filed Dec. 16, 2014, which claims the benefit of and priority to Korean Patent Application No. 10-2013-0160493, filed Dec. 20, 2013, the contents of which are incorporated fully by reference herein.

BACKGROUND

1. Field of the Invention

The present invention relates to a method of designing centrifugal and mixed flow pumps having a specific speed of 150 to 1200, and more particularly, to a pump designing method of setting design variables for designing an impeller, automatically calculating meridional plane information of the impeller from design variable values when the design variable values are input, deriving a vane angle of the impeller from the calculated meridional plane information, and generating a three-dimensional (3D) shape of the impeller, which provides an optimal design of the 3D shape of the impeller by converting tendencies of the design variables of the impeller according to specific speed into functions and turning the tendencies into a database (D/B), more specifically, builds a design D/B for optimizing meridional plane and vane angle distribution shape variables according to specific speed (150 to 1200 Ns) and develops a design program making use of the design D/B to facilitate 3D design of an impeller.

2. Discussion of Related Art

In general, to present a 3D shape of an impeller, there is a necessity for a design program to automatically calculate meridional plane information for the impeller from a design variable for designing the impeller that is set and input and calculate vane angle information of the impeller using the calculated meridional plane information.

Most design programs for centrifugal and mixed flow pumps are foreign products developed based on theories and empirical formulas. Due to being designs based on theories and empirical formulas, the designed shapes are simple. Therefore, when a customer requires high performance, there is inconvenience of having to go through an optimal design operation again.

Also, it is complicated to use the foreign developed design programs and the design programs can only be used by a user with professional knowledge and theories. For this reason, it is difficult for a beginner of pump designing to use the foreign design programs.

As an example, in "CF turbo" which is a representative German pump designing program, traditional German design techniques for pumps, fans, compressors, turbines, turbochargers, and other turbomachines are combined with high-tech software engineering. Due to being a design method based on theories and empirical formulas, the designed shaped are simple, and re-designing is necessary to design a pump having specifications required by a customer.

As another example, "VISTA" developed by PCA in the UK is a program for designing a vane shape when a designer inputs fluid conditions, compressor duty and aerodynamic data, and specific geometry constraints. VISTA is relatively easy to use, and also the designed shapes are simple. By using through-flow calculation as an optimal design method, many design variables can be taken into consideration, but the reliability of interpretation is relatively low.

As still another example, "Concepts NREC" of the USA is a program in which several pieces of software for efficiently designing, interpreting, and manufacturing turbomachines (a pump, a fan, a compressor, and a turbine) widely used throughout industries are integrated. The integrated design-interpretation-manufacturing program makes it possible to simply design a turbomachine, but it is difficult to achieve high performance (high efficiency and strong suction).

Consequently, there is an urgent need to develop a technology for designing centrifugal and mixed flow pumps.

SUMMARY OF THE INVENTION

The present invention is directed to providing a method of designing centrifugal and mixed flow pumps in which various design variables for controlling a meridional plane are defined to numerically represent a three-dimensional (3D) shape of an impeller.

The present invention is also directed to providing a method of designing centrifugal and mixed flow pumps in which design variables are converted into functions according to relationships with a specific speed and optimal design variables are stored as a database (d/B) so that a 3D shape of an impeller can be conveniently designed.

According to an aspect of the present invention, there is provided a method of designing centrifugal and mixed flow pumps having a specific speed of 150 to 1200, the method including: an operation of determining design specifications of a turbo pump including an impeller; an operation of determining a specific speed of the impeller; an operation of determining design variables of the impeller; and an operation of deriving a 3D shape of the impeller.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
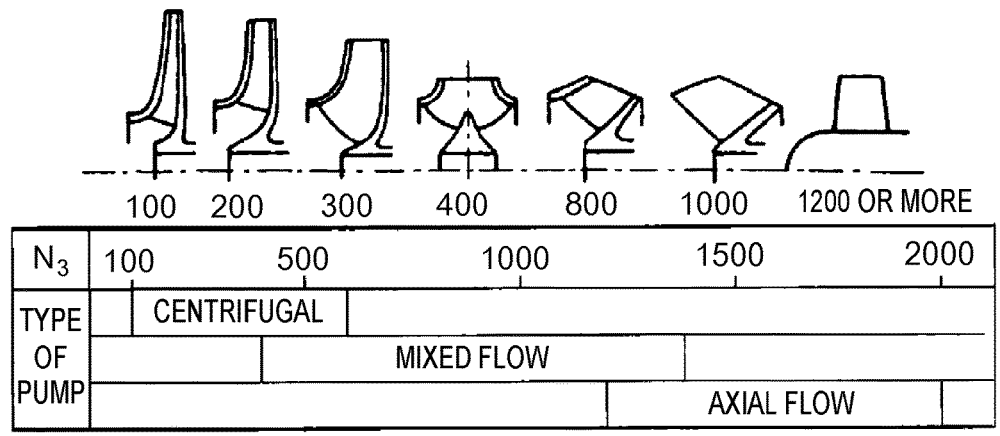
FIG. 1 is a classification diagram of turbo pumps depending on specific speed according to an exemplary embodiment of the present invention.

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. In the drawings, the thickness of layers and regions may be exaggerated for clarity. Throughout the drawings, like numbers refer to like elements.

Embodiments disclosed herein will be described with reference to plan views and cross-sectional views by way of an ideal schematic view of the present invention. Accordingly, exemplary views may be modified depending on manufacturing technologies and/or tolerances. Therefore, embodiments of the present invention are not limited to those shown in the views but include modifications in configuration formed on the basis of manufacturing processes. Therefore, regions exemplified in the drawings have schematic properties and may exemplify specific shapes of regions of elements. However, such exemplified properties and shapes do not limit aspects of the invention.

Hereinafter, a method of designing centrifugal and mixed flow pumps having a specific speed of 150 to 1200 according to an exemplary embodiment of the present invention will be described in detail with reference to the accompanying drawings.

Referring to FIG. 1, pumps are used for fluid transfer in general households and various plant industries (chemical industry, nuclear industry, power plants, offshore plants, etc.). There are a variety of pumps according to requirements, but a description will be made in connection with a turbo pump among them in the present invention. According to specific speed, turbo pumps can be classified into a centrifugal type (100 to 600 Ns), a mixed-flow type (400 to 1400 Ns), and an axial-flow type (1200 Ns or higher).

The present invention is intended to provide an optimal design of the three-dimensional (3D) shape of an impeller by converting tendencies of design variables of the impeller according to specific speed into functions and storing the tendencies as a database (D/B).

The present invention builds a design D/B for optimizing meridional plane and vane angle distribution shape variables according to specific speed (150 to 1200 Ns) and develops a design program making use of the design D/B to facilitate 3D design of an impeller, thereby enhancing product competitiveness.

However, the present invention is limited to centrifugal and mixed flow pumps having uniform tendencies between specific speed and design variables, and axial flow pumps are excluded.

Figure 2:
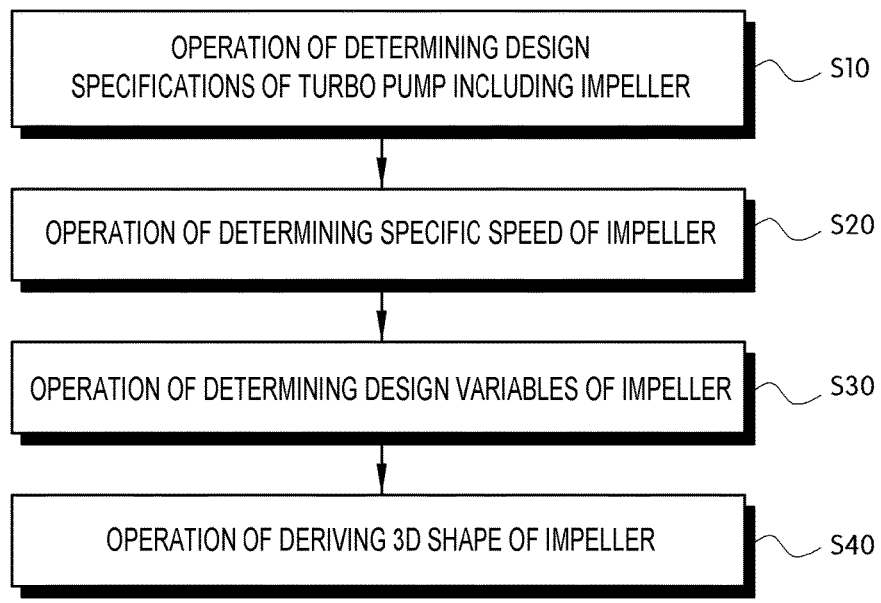
FIG. 2 is a flowchart illustrating a method of designing centrifugal and mixed flow pumps having a specific speed of 150 to 1200 according to an exemplary embodiment of the present invention.

Referring to FIG. 2, a method of designing centrifugal and mixed flow pumps having a specific speed of 150 to 1200 according to an exemplary embodiment of the present invention may include an operation of determining design specifications of a turbo pump including an impeller (S10), an operation of determining a specific speed of the impeller (S20), an operation of determining design variables of the impeller (S30), and an operation of deriving a 3D shape of the impeller (S40).

Design Specification Determination Operation (S10)

Figure 3:
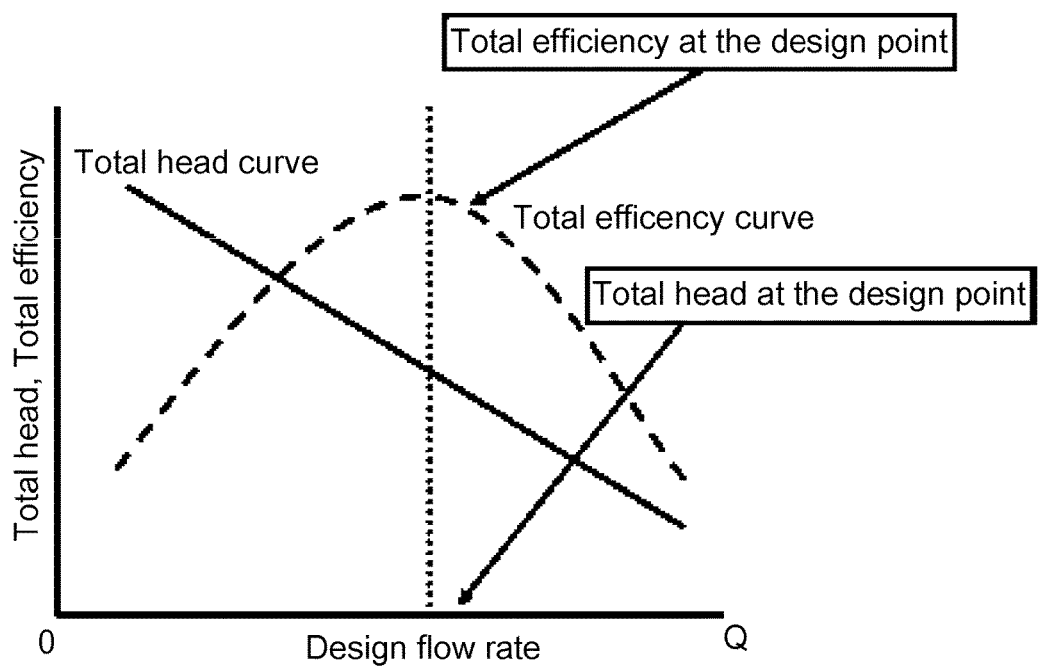
FIG. 3 shows a design specification curve according to an exemplary embodiment of the present invention.

Referring to FIG. 3, design specifications of centrifugal and mixed flow pumps are defined by a flow rate Q, a head Ht, and the number of revolutions N and are required for designing the pumps. Here, the flow rate Q and the head Ht should be basically satisfied while the pumps operate, and the number of revolutions N can be determined according to specifications of the motors. Pump designing should be performed to achieve the highest efficiency with a given flow rate and head.

Specific Speed Determination Operation (S20)

A specific speed (Ns) is defined by the following equation.

$$\text{Specific Speed} = (N_s) = \frac{N\sqrt{Q}}{(H_t)^{3/4}} [m^3/\min \cdot rpm \cdot m]$$

Here, Q=a flow rate, Ht=a head, and N=the number of revolutions.

When the aforementioned pump design specifications, a flow rate Q, a head H, and the number of revolutions N are given, it is possible to calculate a specific speed using the equation. Referring back to FIG. 1, as mentioned above, specific speed is used as an indicator for classifying types of pumps, and types of pumps can be classified according to specific speed. While a pump having a low specific speed is classified as a centrifugal pump, a pump having a high specific speed is classified as an axial flow pump. In other words, a specific speed of a centrifugal pump is determined preferably within a range of 150 to 600 Ns, and a mixed flow pump is determined preferably within a range of 400 to 1200 Ns.

Figure 4:
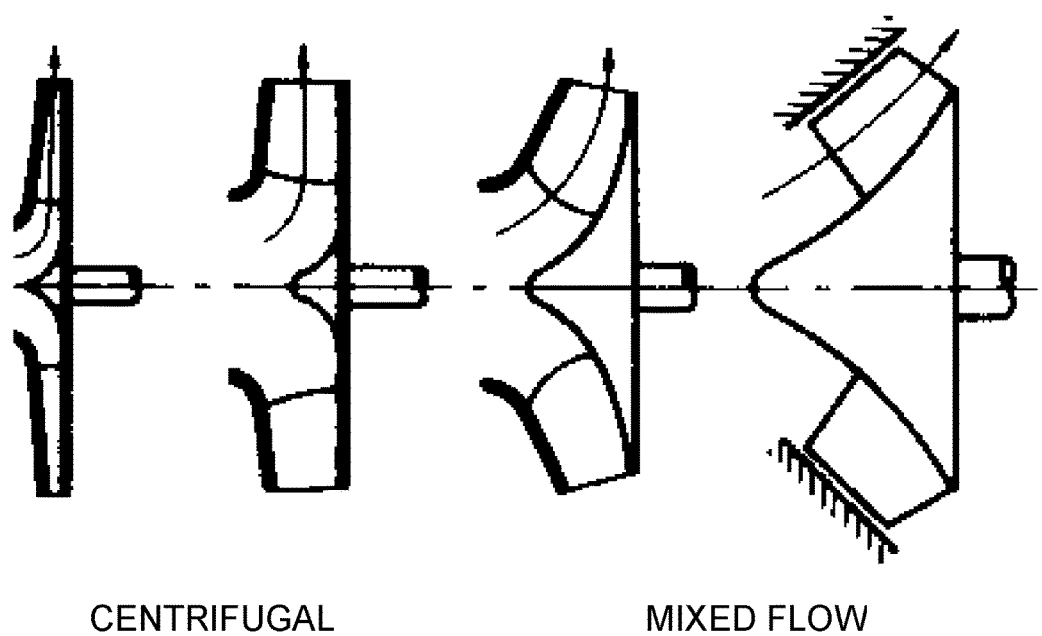
FIG. 4 shows cross-section views of the types of pumps represented by a specific speed according to an exemplary embodiment of the present invention.

Therefore, a specific speed of the present invention is a dimensionless number and may represent the type of pump by the relational formula of a flow rate, a head, and the number of revolutions. Referring to FIG. 4, it is possible to realize that specific rates of centrifugal pumps and mixed flow pumps represent the types of pumps.

Design Variable Determination Operation (S30)

Figure 5:
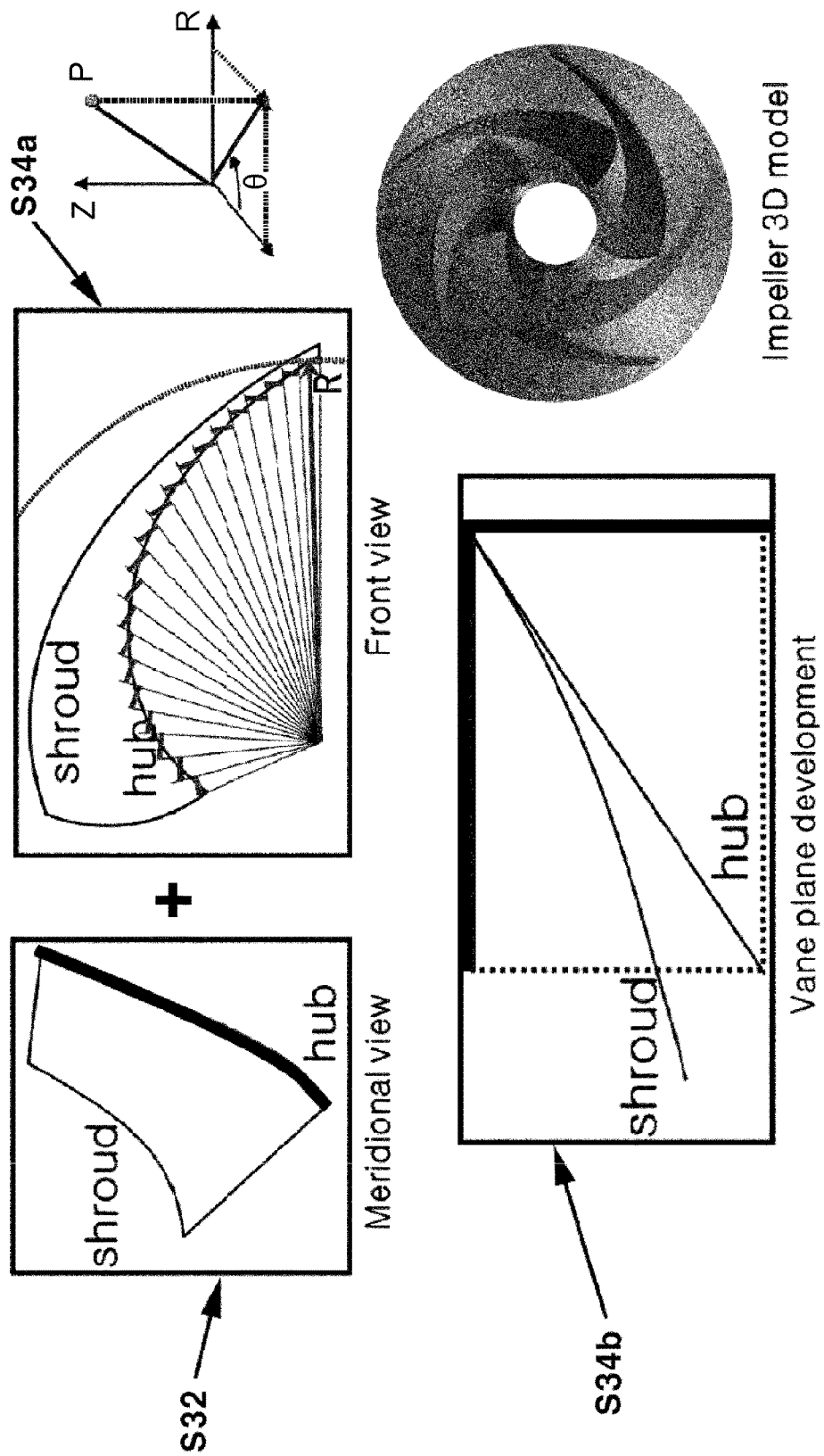
FIG. 5 shows design diagrams of a three-dimensional (3D) shape obtained using meridional plane information and vane angle information according to an exemplary embodiment of the present invention.

Referring to FIG. 5, a meridional view design operation (S32) of designing a vane shape and a vane angle design operation (S34) of designing a vane angle are required to generate the 3D shape of an impeller.

The meridional view design operation (S32) is an operation of calculating meridional plane data by inputting basic design variables and additional design variables of a meridional plane of the impeller. After calculating basic coordinate values of the meridional plane from the basic design variables, it is possible to calculate straight line sections included in a hub and a shroud from the additional design variables and then calculate a curve section connecting an inlet and an outlet.

The vane angle design operation (S34) may include an operation of generating a front view representing a vane angle (S34a) or an operation of generating a vane plane development representing a vane angle according to meridional plane coordinates (S34b).

In the operation of generating a front view (S34a), a vane angle of the impeller is represented with a radius and the direction of rotation (r and h). In the operation of generating a vane plane development (S34b), the meridional plane data of the impeller calculated in the meridional view design operation (S32) described above is input, and meridional plane data consisting of coordinate values (z, r) in an axial direction and a radial direction is acquired. Also, values of variables for designing a vane plane development may be input, and a vane plane development may be presented.

In particular, the operation of generating a vane plane development (S34b) may be performed in two ways according to curve control method, that is, Bezier curve control and classical curve control. According to the Bezier curve control, because a sweep angle of a vane is included as a variable, it is possible to control a vane length. On the other hand, according to the classical curve control, the vane length of the impeller is defined as a curve which smoothly connects inlet and outlet angles, and thus the vane length and the sweep angle can be determined by the inlet and outlet angles of the impeller.

It is possible to calculate vane plane development information using meridional plane information and front view information (S34b) or calculate front view information using the meridional plane information and vane plane development information (S34a).

The meridional view design operation (S32) will be described in detail below.

Figure 6:
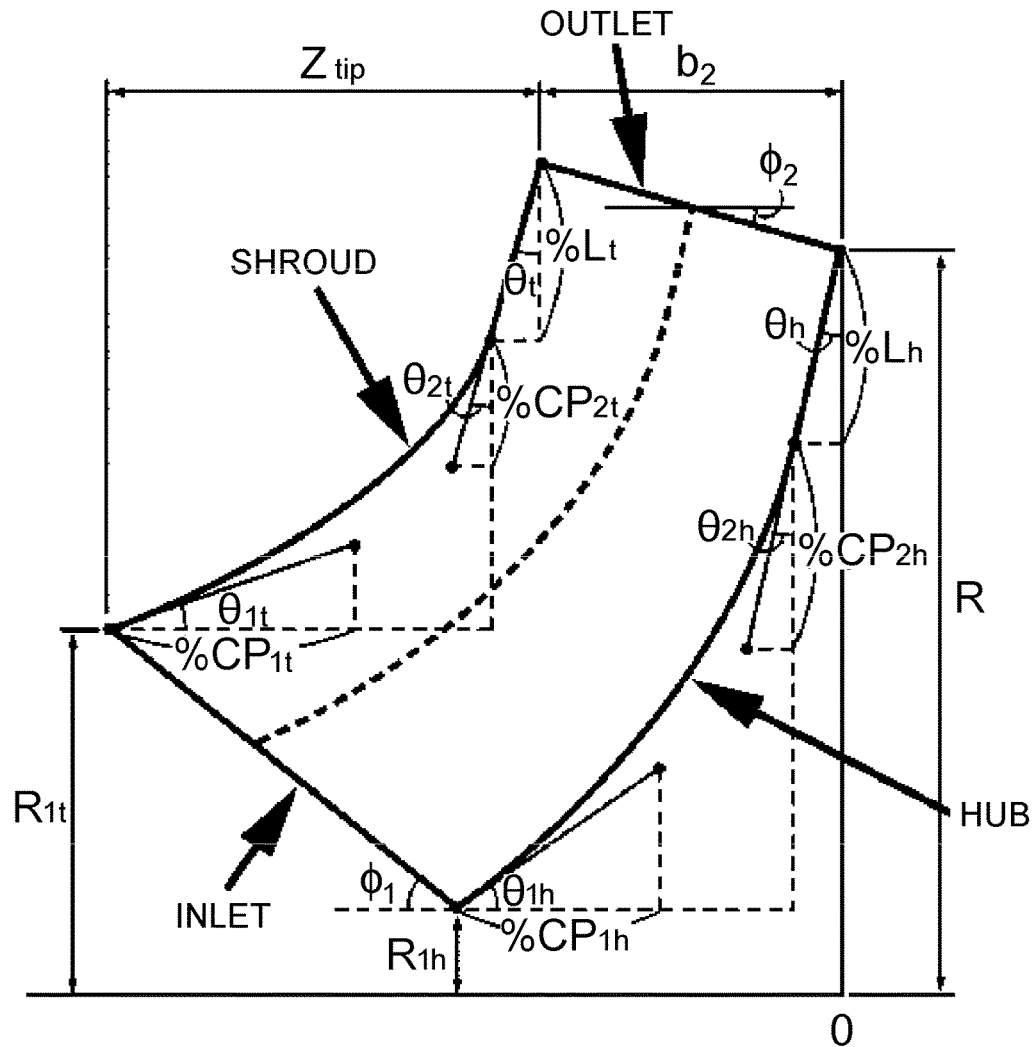
FIG. 6 is a side view showing variables for designing a meridional plane according to an exemplary embodiment of the present invention.

Referring to FIG. 6, basic design variables for setting a framework of a meridional plane may include an inner diameter R1$h$ of the hub at the inlet of the impeller, an inner diameter R1$t$ of the shroud at the inlet of the impeller, an angle φ1 at the leading edge of a vane of the impeller, a diameter R2 of the outlet of the impeller, a vane width b2 at trailing edges of the vane of the impeller, an angle φ2 at the trailing edge of the vane of the impeller, and an axial direction length Ztip from an inlet to an outlet of the shroud.

Among the variables, the inner diameter R1$h$ of the hub and the inner diameter R1$t$ of the shroud indicate basic coordinate information to represent the area and the vane shape of the inlet of the impeller. The angle φ1 at the leading edge of the vane of the impeller represents the angle between the areal distribution of the leading edge of the vane and a center axis (Z axis) of the impeller in connection with the inner diameters R1$h$ and R1$t$ and is related to the area of the inlet. The diameter R2 of the outlet of the impeller is a variable representing the overall size of the impeller, and the size of the impeller shape may be determined by the diameter R2. The vane width b2 at the trailing edge of the vane of the impeller and the angle φ2 at the trailing edge of the vane determine the area of the outlet. The determined area has an influence on outlet pressure and speed later. The axial direction length Ztip from the inlet to the outlet of the shroud is a variable which represents the size of the impeller in the axial direction to determine the size of the impeller shape in the axial direction.

The aforementioned variables are for determining the basic coordinate values of the meridional plane, and in addition to these, additional variables are necessary to connect the hub and the shroud from the inlet to the outlet.

To this end, the additional variables for designing the meridional plane may further include an inlet angle θ1$t$ between the shroud curve of the impeller and a horizontal line and an outlet angle θ2$t$ between the shroud curve of the impeller and a vertical line, an inlet angle θ1$h$ between the hub curve of the impeller and a horizontal line and an outlet angle θ2$h$ between the hub curve of the impeller and a vertical line, lengths % Lh and % Lt of straight line portions of the hub and the shroud at the impeller outlet, shroud inlet and outlet control points % CP1$t$ and % CP2$t$ for generating a Bezier curve from a point at which the straight line portion of the outlet ends to the impeller inlet, and hub inlet and outlet control points % CP1$h$ and % CP2$h$ for generating a Bezier curve from a point at which the straight line portion of the outlet ends to the impeller inlet.

Briefly speaking of the variables, the lengths % Lh and % Lt denote the lengths of the straight line portions existing at the outlet. Also, a curve connecting the inlet and the outlet of the meridional plane of the impeller has a predetermined angle with respect to the horizontal line at the inlet and a predetermined angle with respect to the vertical line at the outlet, and inlet angles θ1$h$ and θ1$t$ and the outlet angles θ2$h$ and θ2$t$ denote angles of the inlet and the outlet on both sides, that is, the hub and the shroud.

Also, to connect the points at which the straight line portions at the outlet of the impeller end to the inlet with smooth curves, arcs can be combined or a Bezier curve can be used. The Bezier curve defines and represents a curve using vertices of a polygon approximately corresponding to a curve to be generated. The control points % CP1$t$, % CP2$t$, % CP1$h$, and % CP2$h$ are control points for generating the Bezier curve.

The vane angle design operation S34 will be described below.

Figure 7:
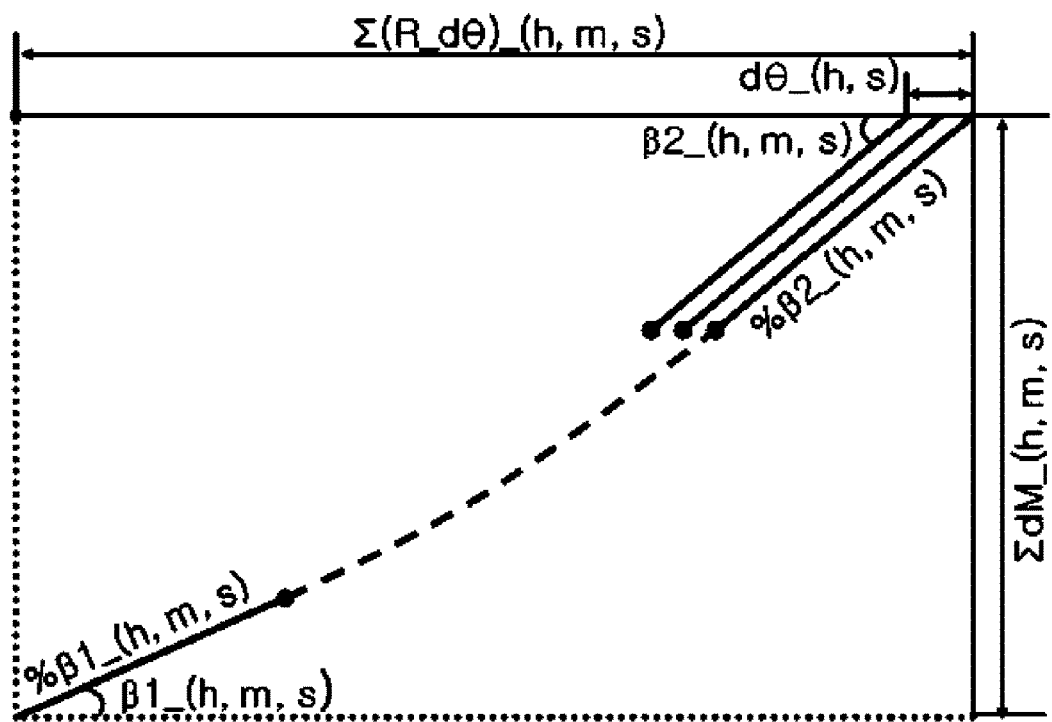
FIG. 7 is a graph showing variables for designing a vane angle according to an exemplary embodiment of the present invention.

As mentioned above, a vane angle design method can be defined with the Bezier curve control and the classical curve control. Referring to FIG. 7, the classical curve control will be described here.

According to the classical curve control, the vane length of the impeller is defined as a curve which smoothly connects an inlet angle and an outlet angle, and thus the vane length and the sweep angle are determined according to the inlet and outlet angles of the impeller.

In the case of the classical curve control, it is possible to input an inlet angle beta1_(h,m,t), an outlet angle beta2_(h,m,t), a length % beta_LE_(h,m,t) of a straight line portion of the inlet, a length % beta_TE_(h,m,t) of a straight line portion of the outlet, and an angle d_theta(m,h) at which the outlet is tilted in a rotation direction.

When the vane plane development design variables are input as mentioned above, straight line portions and curved portions of the vane plane development are calculated using the input variables, and a vane angle (theta value) according to meridional plane coordinates is calculated and output.

Figure 8:
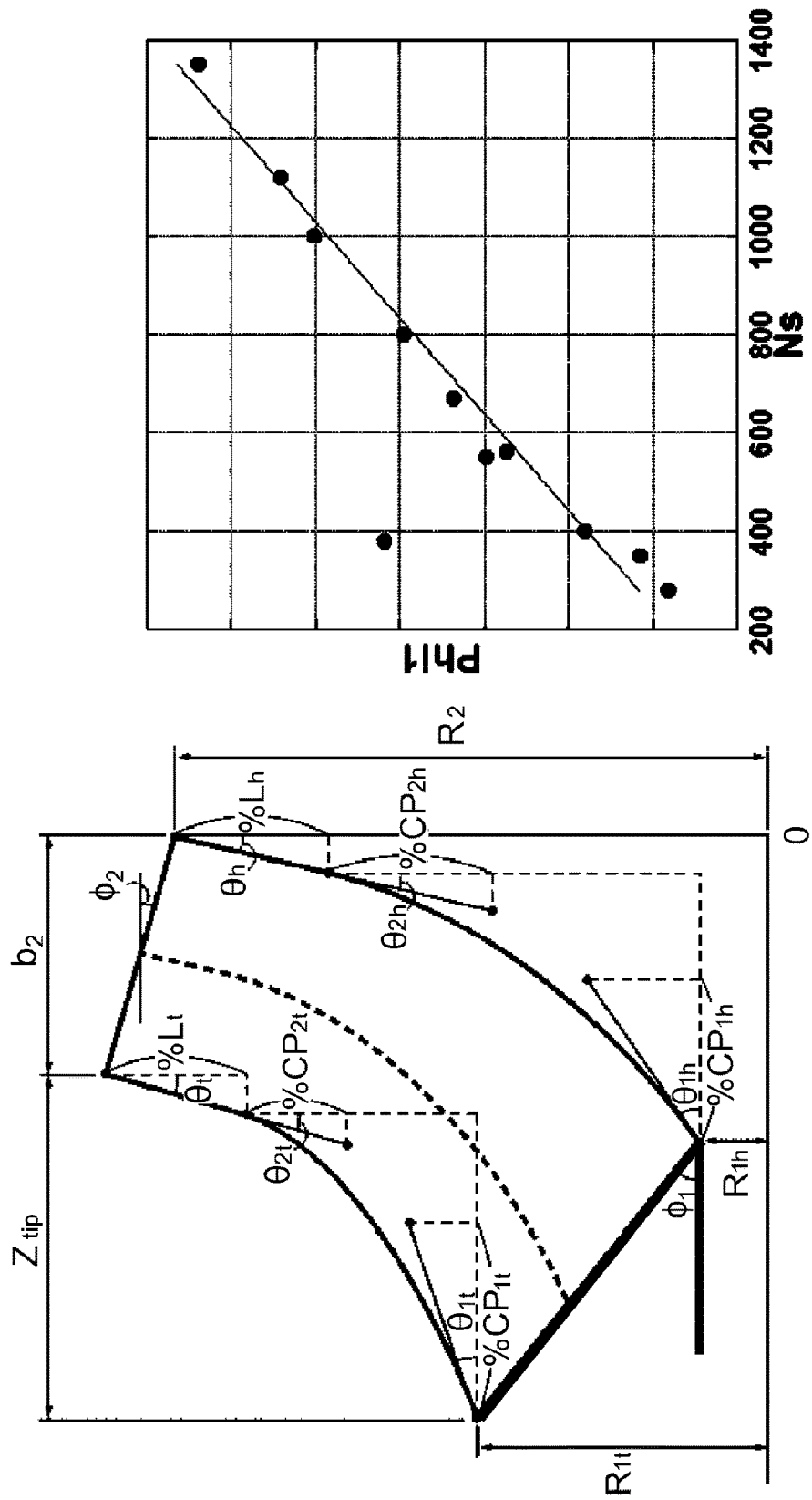
FIG. 8 is a graph showing a tendency between a variable for designing a meridional plane and a specific speed of an impeller according to an exemplary embodiment of the present invention.
Figure 9A:
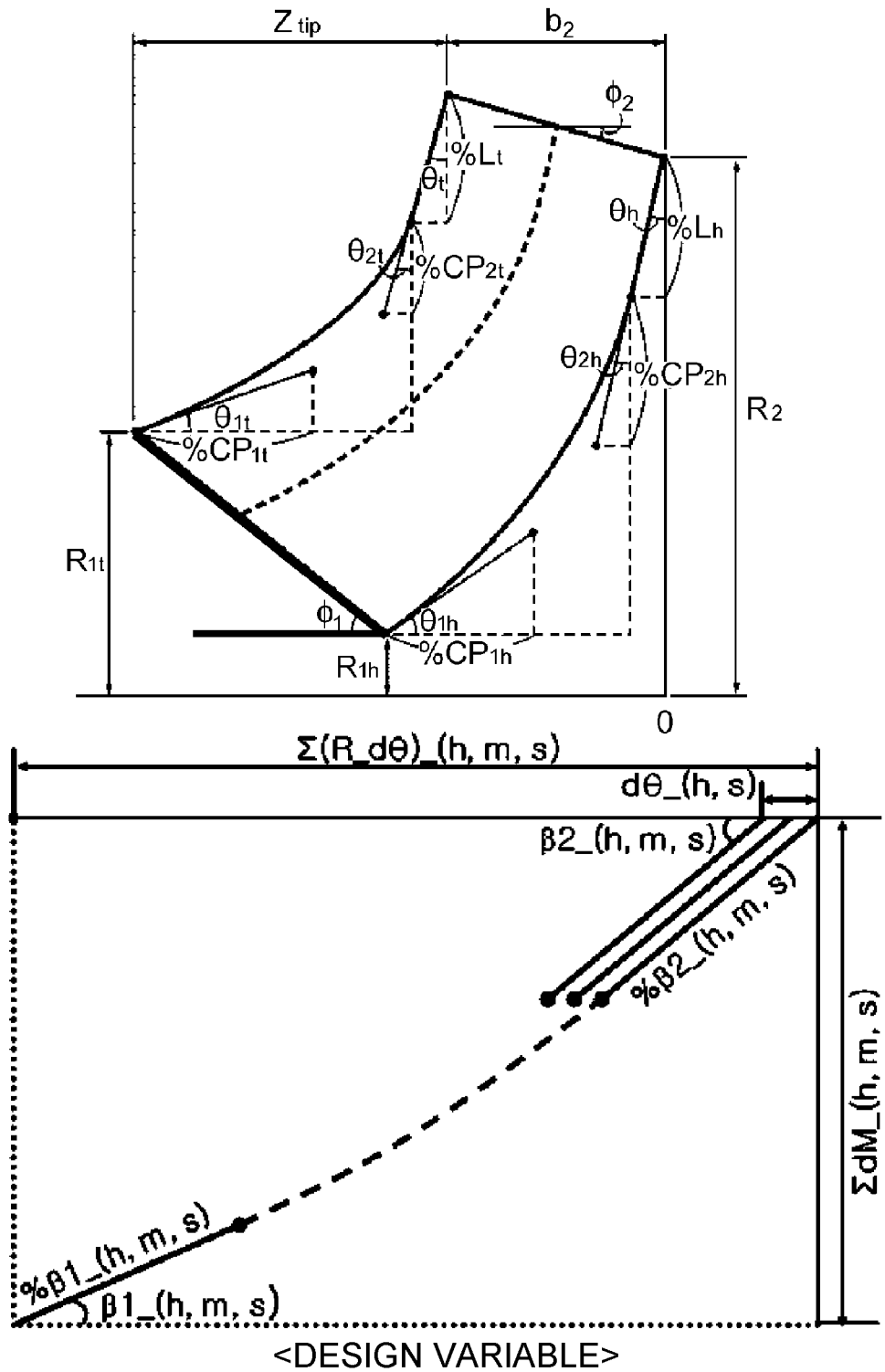
FIGS. 9A to 9D are diagrams showing an example of a process of deriving a 3D shape of an impeller according to an exemplary embodiment of the present invention.
Figure 9B:
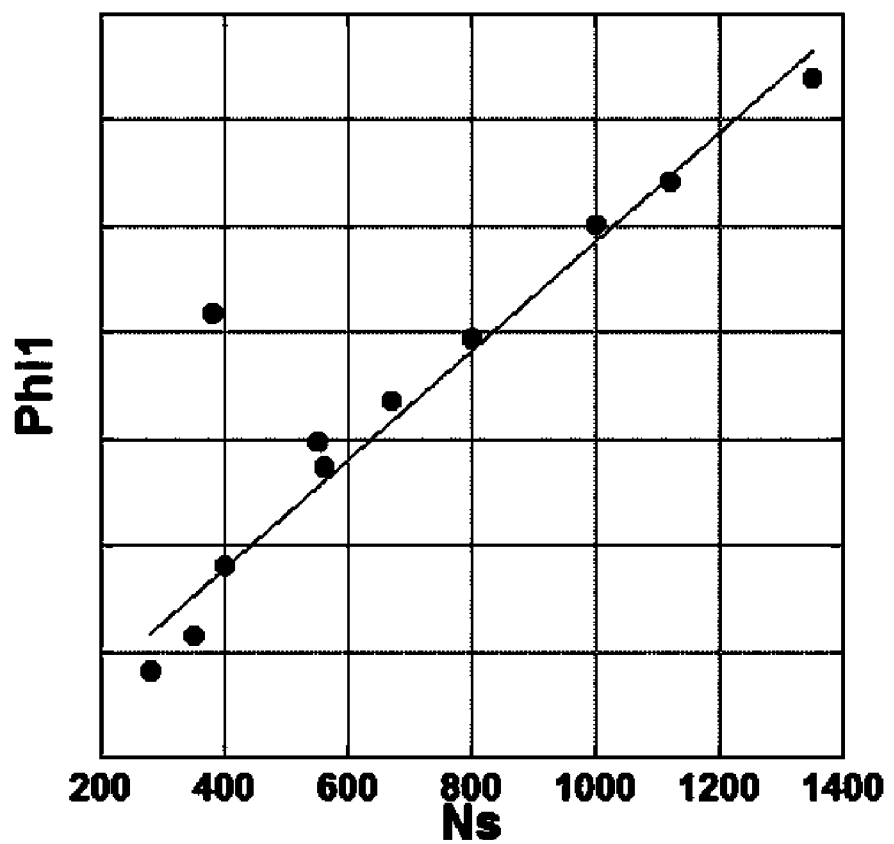
Figure 9C:
Figure 9D:
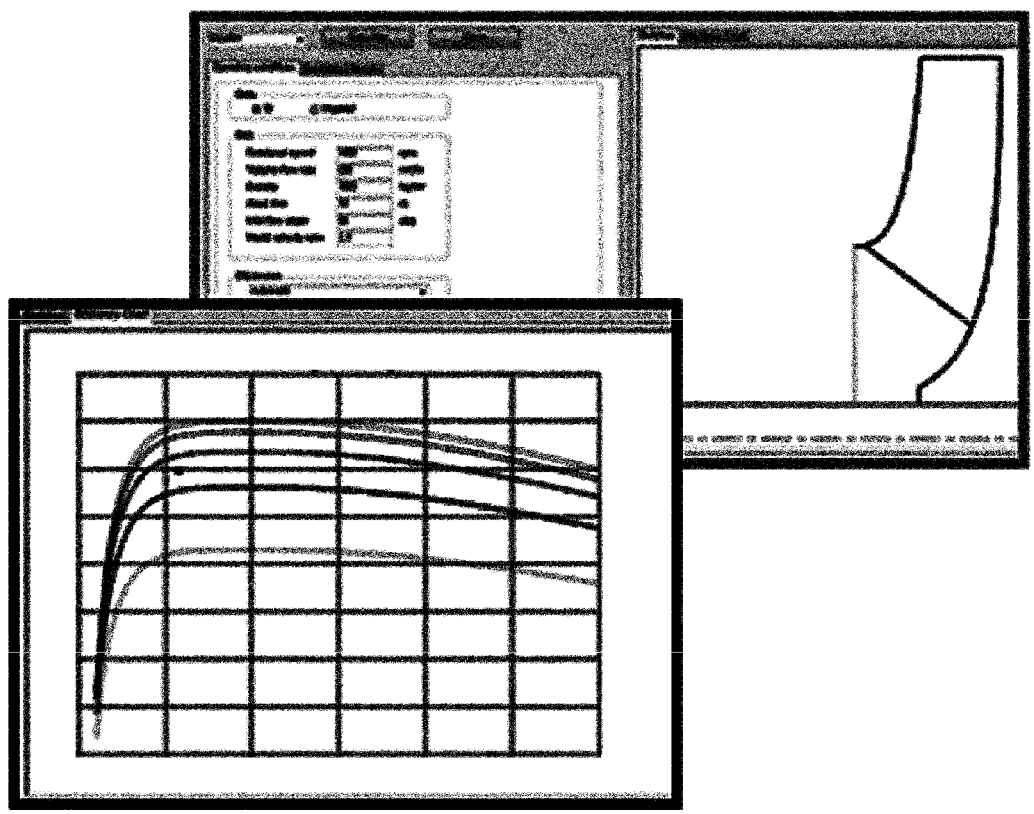

Referring to FIG. 8, it is possible to know that a design variable which is an angle Φ1(phi1) between the meridional plane and the inlet of the impeller has a particular tendency according to specific speed.

Shape Derivation Operation (S40)

Sequentially referring to FIGS. 9A to 9D, as in the sequential processes of defining the design variables, converting the design variables into functions, generating the 3D shape of an impeller, and building a graphical user interface (GUI) environment, when design specifications of a pump are given, the present invention can design a shape of the pump using a tendency of a design variable according to specific speed. By converting the design variables into functions, it is possible to easily derive the 3D shape of the impeller, and by building the GUI environment, it is possible to provide 3D computer-aided design (CAD) data for generating a designed pump shape.

Figure 10A:
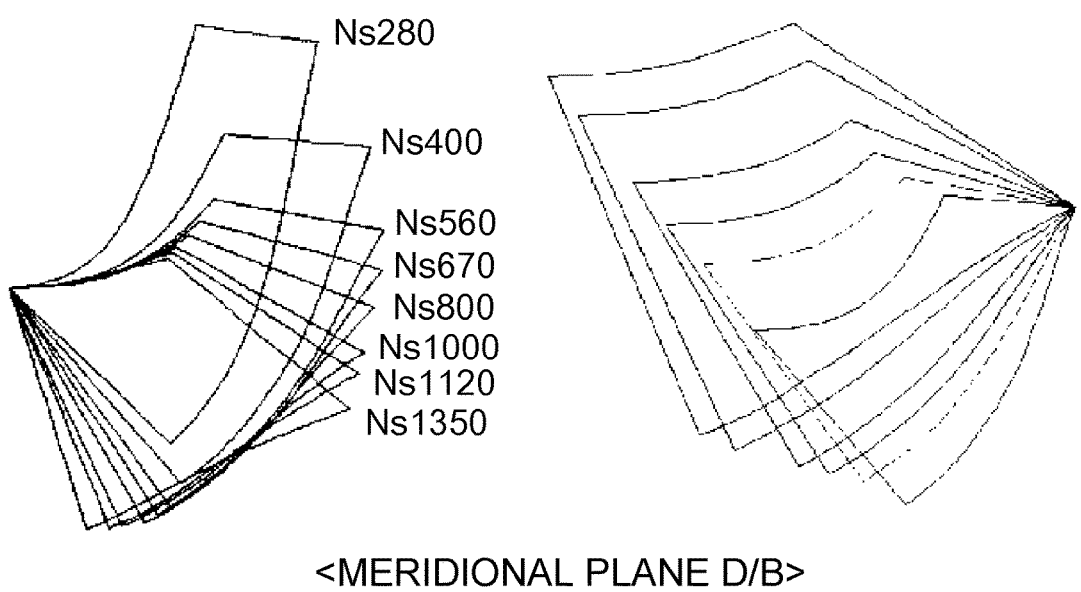
FIGS. 10A to 10C are diagrams showing an example of a process of building a meridional plane database (D/B) according to an exemplary embodiment of the present invention.
Figure 10B:
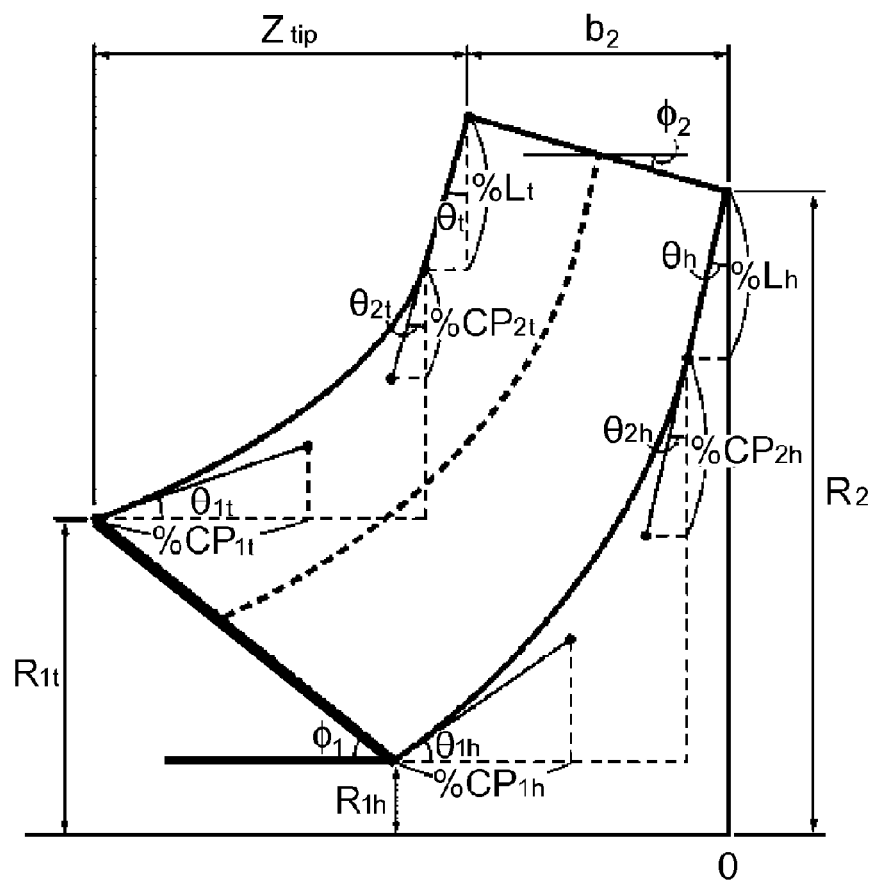
Figure 10C:
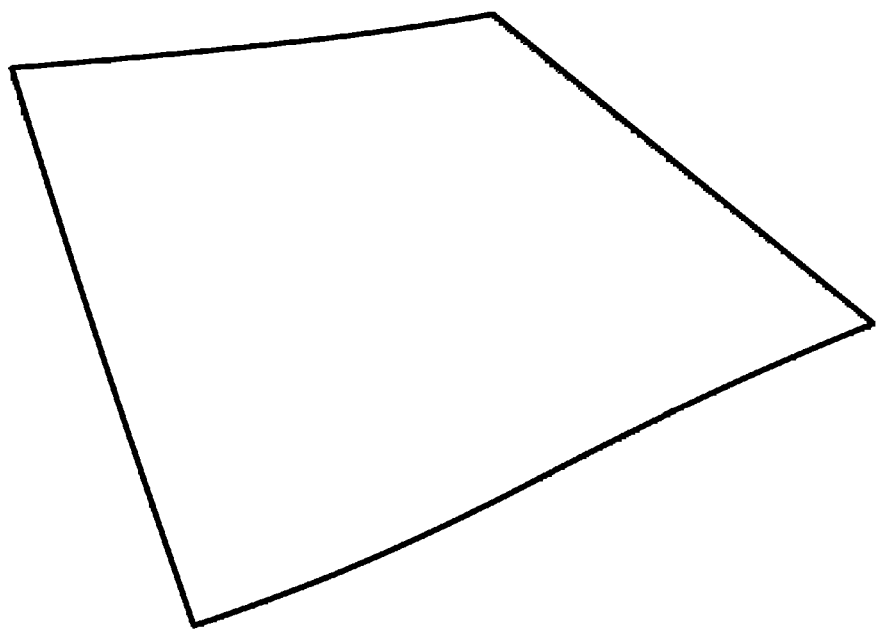

Sequentially referring to FIGS. 10A to 10C as in the sequential processes of storing meridional planes as a D/B, optimizing the design variables, and designing a meridional plane of the impeller, definitions of pump shapes according to specific speed are absolutely required to develop a pump designing program for ensuring a predetermined level of performance or higher according to specific speed. To build D/Bs for each of the defined design variables, there is a need for a process of deriving shapes of optimally designed centrifugal and mixed flow pumps and turning the shapes into a D/B. To build a centrifugal and mixed flow pump design D/B, there is a need for a process of optimally designing a shape for each shape variable according to specific speed, analyzing tendencies of the design variables for the optimally designed shape according to specific speed, and converting the tendencies into functions.

Figure 11A:
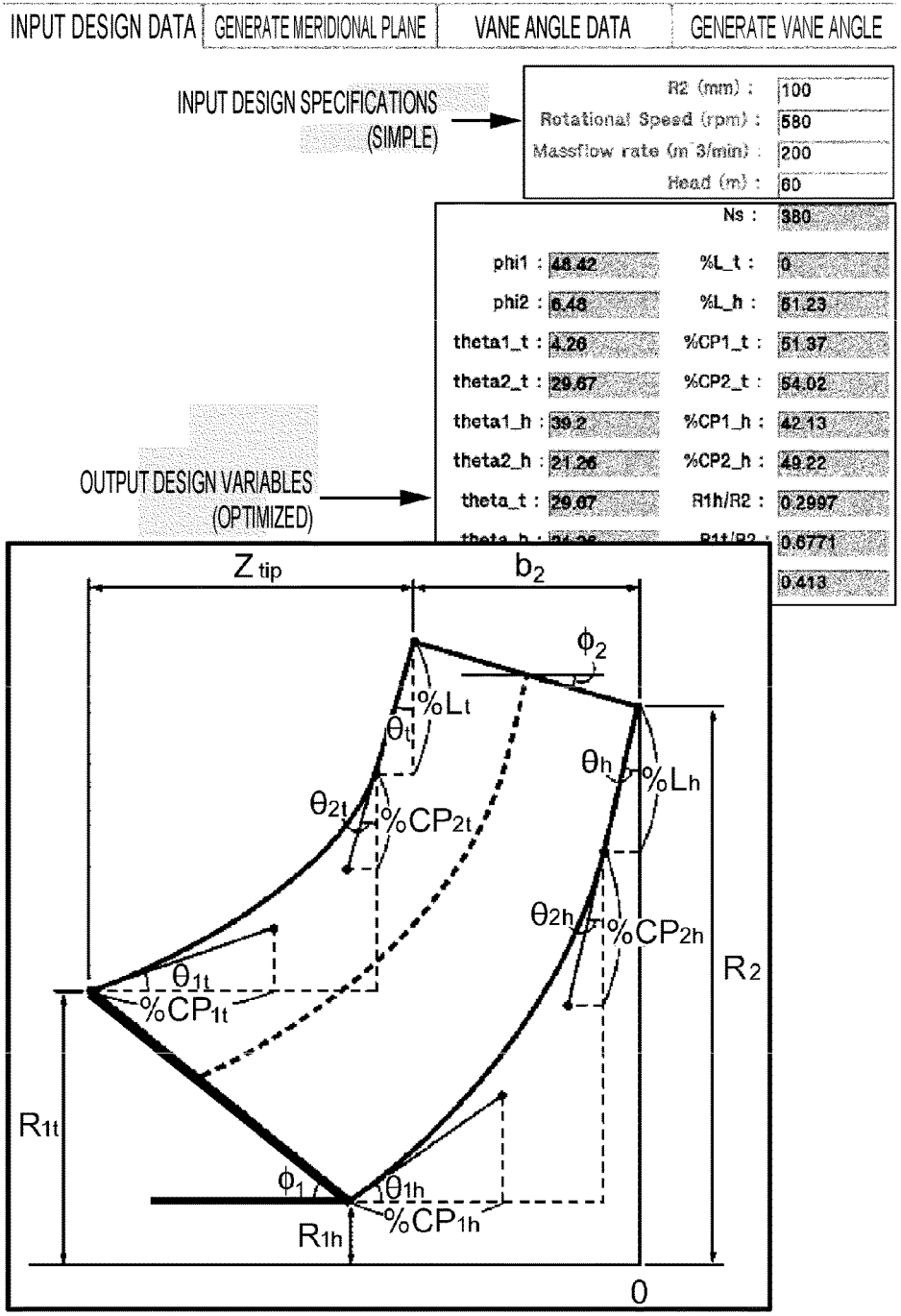
FIGS. 11A to 11B are diagrams illustrating execution of a program in which optimal design information is used depending on a specific speed according to an exemplary embodiment of the present invention.
Figure 11B:
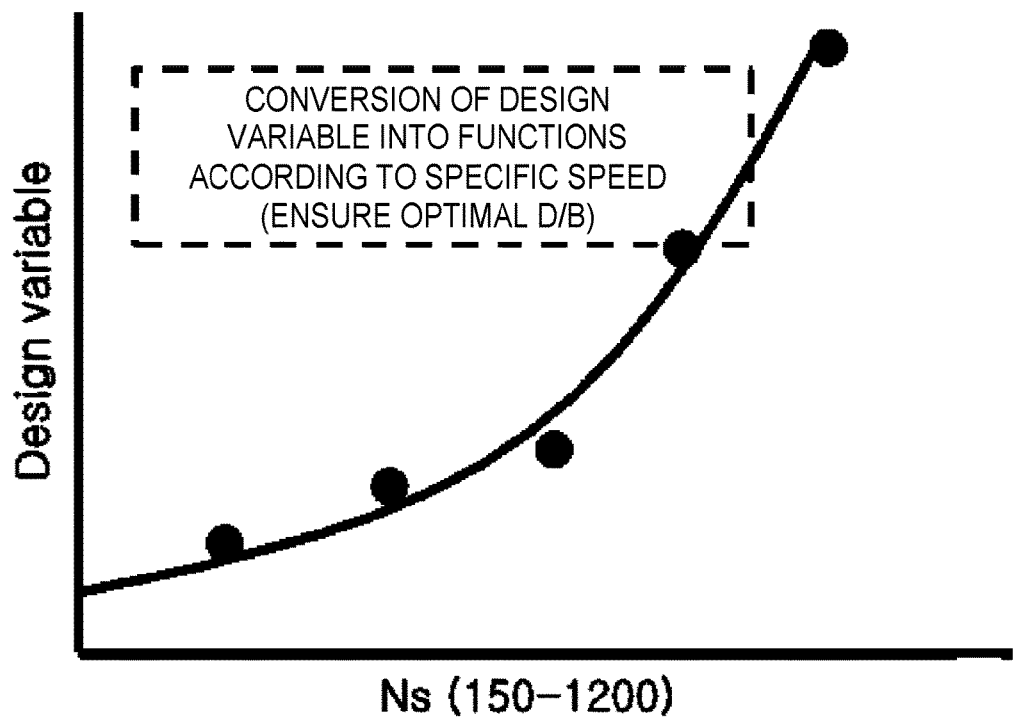

Referring to FIGS. 11A and 11B, when the tendencies of the design variables are converted into functions and turned into a D/B, it is possible to output optimized design variables by just inputting design specifications.

As described above, according to exemplary embodiments of the present invention, it is possible to expect the following effects.

Since various design variables for controlling a meridional plane are defined to present a 3D shape of an impeller in numbers, it is easy to design the impeller. In particular, the design variables are converted into functions according to relationships with a specific speed, and optimized design variables are turned into a D/B, so that the 3D shape of the impeller can be conveniently designed.

Further, during design dependent on experience, it is possible to ensure performance at a certain level or above according to specific speed by building D/Bs according to specific speed and deriving design variables based on the D/Bs, and thus it is expected that the reliability of a pump will be increased.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of generating a three-dimensional (3D) image of an impeller for a turbo pump, the method comprising the steps of:
    determining design specifications of the turbo pump, the design specifications including a flow rate, a head, and a number of revolutions;
    determining a specific speed of the impeller, wherein the specific speed is a dimensionless number representing a type of the turbo pump with a relational formula of the flow rate, the head, and the number of revolutions;
    determining design variables of the impeller, wherein the step of determining design variables of the impeller includes generating a vane shape of the impeller via a meridional view design operation and generating a vane angle of the impeller via a vane angle design operation, wherein the meridional view design operation includes inputting design variables of a meridional plane of the impeller, wherein the design variables of the meridional plane include an inner diameter R1$h$ of a hub at an inlet of the impeller, an inner diameter R1$t$ of a shroud at the inlet of the impeller, an angle φ1 at a leading edge of a vane of the impeller, a diameter R2 of an outlet of the impeller, a vane width b2 at a trailing edge of the vane of the impeller, an angle φ2 at the trailing edge of the vane, and an axial direction length Ztip from an inlet to an outlet of the shroud, wherein the angle φ1 at the leading edge of the vane of the impeller has tendencies according to sections of a specific speed of 150 to 1200 Ns, wherein the angle φ1 of the leading edge of the vane is provided in a database, the database being prepared by converting the tendencies of the design variables of the impeller according to the specific speed into functions; and
    generating a 3D shape of the impeller.

2. The method of claim 1, wherein the turbo pump includes a centrifugal pump and a mixed flow pump, and
    a specific speed of the centrifugal pump is lower than a specific speed of the mixed flow pump.

3. The method of claim 2, wherein the specific speed of the centrifugal pump is determined within a range of 150 to 600 Ns, and
    the specific speed of the mixed flow pump is determined within a range of 400 to 1200 Ns.

4. The method of claim 1, wherein the angle Φ has tendencies in units of 70 Ns within a range of 150 to 360 Ns and has tendencies in units of 150 Ns within a range of 250 to 1200 Ns.

5. The method of claim 1, wherein the vane angle design operation includes inputting design variables of a vane plane development of the impeller, and
    the design variables of the vane plane development include an inlet angle beta1_(h,m,t), an outlet angle beta2_(h,m,t), a length % beta_LE_(h,m,t) of a straight line portion of an inlet, a length % beta_TE_(h,m,t) of a straight line portion of an outlet, and an angle d_theta(m,h) at which the outlet is tilted in a rotation direction.

6. The method of claim 5, wherein the angle d_theta(m,h) has tendencies according to sections of the specific speed of 150 Ns to 1200 Ns.

7. The method of claim 1, wherein the design specifications of the turbo pump are defined as a flow rate, a head, and a number of revolutions, and the specific speed is a dimensionless number representing a type of the turbo pump with a relational formula of the flow rate, the head, and the number of revolutions.

* * * * *